United States Patent
Kim

(10) Patent No.: US 9,423,806 B2
(45) Date of Patent: Aug. 23, 2016

(54) SEMICONDUCTOR DEVICE

(71) Applicant: SK hynix Inc., Gyeonggi-do (KR)

(72) Inventor: Jong-Hwan Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 357 days.

(21) Appl. No.: 14/105,409

(22) Filed: Dec. 13, 2013

(65) Prior Publication Data
US 2014/0376138 A1    Dec. 25, 2014

(30) Foreign Application Priority Data

Jun. 21, 2013 (KR) .................. 10-2013-0071567

(51) Int. Cl.
| | |
|---|---|
| H02H 1/00 | (2006.01) |
| H02H 1/04 | (2006.01) |
| H02H 3/22 | (2006.01) |
| G05F 1/10 | (2006.01) |
| H02H 9/04 | (2006.01) |

(52) U.S. Cl.
CPC . *G05F 1/10* (2013.01); *H02H 9/04* (2013.01)

(58) Field of Classification Search
CPC ............ H02H 9/00; H02H 9/04; G05F 1/10
USPC ....................................................... 361/91.1
See application file for complete search history.

(56) References Cited

U.S. PATENT DOCUMENTS

2010/0237930 A1*   9/2010   Byeon .................... G11C 5/145
                                              327/536

FOREIGN PATENT DOCUMENTS

| KR | 1019980075793 | 11/1998 |
|---|---|---|
| KR | 1020100003077 | 1/2010 |

* cited by examiner

*Primary Examiner* — Dharti Patel
(74) *Attorney, Agent, or Firm* — IP & T Group LLP

(57) ABSTRACT

A semiconductor device includes an external voltage detection unit suitable for detecting a voltage level of an external voltage to output an external voltage detection signal based on the detected result, a reference voltage generation unit suitable for generating a reference voltage based on the external voltage, an internal voltage generation unit enabled in response to the external voltage detection signal, suitable for selectively generating a voltage corresponding to the reference voltage as an internal voltage, and an internal voltage control unit suitable for selectively providing a voltage having a target level corresponding to the internal voltage as the internal voltage in response to the external voltage detection signal.

16 Claims, 5 Drawing Sheets

SEMICONDUCTOR DEVICE

CROSS-REFERENCE TO RELATED APPLICATIONS

The present application claims priority of Korean Patent Application No. 10-2013-0071567, filed on Jun. 21, 2013, which is incorporated herein by reference in its entirety.

BACKGROUND

1. Field

Exemplary embodiments of the present invention relate to a semiconductor design technology, and more particularly, to a semiconductor device.

2. Description of the Related Art

In general, a protection circuit for preventing an electrical over-stress (EOS) is provided in a semiconductor device. The EOS is an electrical shock such as abnormal over-current or over-voltage due to leakage current and voltage of plants using a power supply voltage, and may occur for nanoseconds to milliseconds. When the EOS occurs, a gate oxide layer of a transistor included in an internal circuit may be broken. Thus, the protection circuit is essentially provided to protect the internal circuit from the EOS.

FIG. 1 is a block diagram illustrating a conventional protection circuit. FIG. 2 is a detailed circuit diagram illustrating an over-voltage discharge unit shown in FIG. 1.

Referring to FIG. 1, the protection circuit 10 includes an external voltage detection unit 11 and an over-voltage discharge unit 13. The external voltage detection unit 11 detects a voltage level of a supply voltage VDD supplied from external, to output an external voltage detection signal HVDD. The over-voltage discharge unit 13 discharges the supply voltage VDD in an over-voltage state in response to the external voltage detection signal HVDD.

Here, the external voltage detection unit 11 continuously detects the voltage level of the supply voltage VDD and activates the external voltage detection signal HVDD when the supply voltage VDD is out of range to be in the over-voltage state. The over-voltage discharge unit 13 returns the supply voltage VDD to a normal-voltage state from an over-voltage state by a discharging operation when the external voltage detection signal HVDD is activated.

As shown in FIG. 2, the over-voltage discharge unit 13 includes a first inverter INV1, a second inverter INV2, and an NMOS transistor N1. The first inverter INV1 inverts the external voltage detection signal HVDD. The second inverter INV2 inverts an output of the first inverter INV1. The NMOS transistor N1 has a drain-source path between a supply voltage (VDD) terminal and a ground voltage (VSS) terminal and a gate coupled to the ground voltage (VSS) terminal, and receives an output signal of the second inverter INV2 as a bulk bias. Accordingly, when the supply voltage VDD is in an over-voltage state due to an EOS the over-voltage discharge unit 13 may perform a discharge operation by forming a discharge path D from a PMOS transistor P1 included in the second inverter INV2 to a source terminal of the NMOS transistor N1, in response to the external voltage detection signal HVDD.

Meanwhile, a semiconductor device includes plural internal voltage generation circuits for generating various internal voltages required for an internal operation based on the supply voltage VDD supplied from external. The internal voltage generation circuits may be classified with a pump type and a regular type. In a case of the pump type, the internal voltage generation circuits generate a voltage whose level is higher than the supply voltage VDD, e.g., a boost voltage VPP, and a voltage whose level is lower than the ground voltage VSS, e.g., a back-bias voltage VBB, through a charge pumping method. In a case of the regular type, the internal voltage generation circuits generate a positive voltage that is used in the semiconductor device and has a level lower than the supply voltage VDD, e.g., a core voltage VCORE, a bit line precharge voltage VBLP, or the like, through a voltage down-converting method.

FIG. 3 is a block diagram illustrating a conventional internal voltage generation circuit. FIG. 4 is a detailed circuit diagram illustrating the conventional internal voltage generation circuit shown in FIG. 3.

Referring to FIG. 3, the internal voltage generation circuit 20 includes a reference voltage generation unit 21 and an internal voltage generation unit 23. The reference voltage generation unit 21 generates a reference voltage VREF based on the supply voltage VDD. The internal voltage generation unit 23 is a pump type to generate a boost voltage VPP corresponding to the reference voltage VREF.

Here, the reference voltage generation unit 21 generates the reference voltage VREF corresponding to a target level of the boost voltage VPP using the supply voltage VDD.

Referring to FIG. 4, the internal voltage generation unit 23 includes an internal voltage detector 23A, an oscillator 23B, and a pump 23C. The internal voltage detector 23A compares the boost voltage VPP with the reference voltage VREF to generate a pumping enable signal EN. The oscillator 23B outputs an oscillation signal OSC in response to the pumping enable signal EN. The pump 23C generates the boost voltage VPP in response to the oscillation signal OSC. Here, the internal voltage detector 23A activates the pumping enable signal EN when the boost voltage VPP is lower than the reference voltage VREF, and deactivates the pumping enable signal EN when the boost voltage VPP is higher than or identical to the reference voltage VREF. The pump 23C generates the boost voltage VPP by boosting the supply voltage VDD in response to the oscillation signal OSC.

However, the above semiconductor device may have following concerns.

FIG. 5 is a graph illustrating an abnormal operation of a conventional semiconductor device.

Hereinafter, referring to FIGS. 1 to 5, an operation of the semiconductor device is described in detail.

When the supply voltage VDD is in an over-voltage state under the influence of the EOS, the protection circuit 10 of FIG. 1 is enabled to lower the supply voltage VDD to a normal-voltage state. At this time, during a period from the over-voltage state to the normal-voltage state, the internal voltage generation circuit 20 of FIG. 3 malfunctions due to the supply voltage VDD in the over-voltage state.

For example, if the reference voltage VREF is increased due to the supply voltage VDD in the over-voltage state, the internal voltage generation unit 23 may perform an abnormal pumping operation, and thus the internal voltage generation unit 23 increases the boost voltage VPP until a target level corresponding to the supply voltage VDD in the over-voltage state.

As shown in FIG. 5, when the supply voltage VDD is in an over-voltage state (refer to a solid line) under the influence of the EOS, the boost voltage VPP becomes in an abnormal state (refer to a solid line). Then, when the supply voltage VDD returns to a normal-voltage state (refer to a dotted line) by the protection circuit, the boost voltage VPP also becomes in a normal state (refer to a dotted line). At this time, even if the supply voltage VDD returns to the normal-voltage state from the over-voltage state, the reference voltage VREF may not return to a normal state within a desirable time but stays in an abnormal state. That is, there may be the time difference between the supply voltage VDD and the reference voltage VREF in order to return to the normal state, and the time difference is determined by a performance of the reference voltage generation unit 21.

Therefore, due to the abnormal pumping operation of the internal voltage generation unit 23, the supply voltage VDD is excessively consumed. Accordingly, power lines near the internal voltage generation unit 23, i.e., power lines for supplying the supply voltage VDD, may be deteriorated.

SUMMARY

An exemplary embodiment of the present invention is directed to a semiconductor device that prevents an abnormal operation of an internal voltage generating circuit due to an electrical over-stress (EOS).

In accordance with an exemplary embodiment of the present invention, a semiconductor device may include an external voltage detection unit suitable for detecting a voltage level of an external voltage to output an external voltage detection signal based on the detected result, a reference voltage generation unit suitable for generating a reference voltage based on the external voltage, an internal voltage generation unit enabled in response to the external voltage detection signal suitable for selectively generating a voltage corresponding to the reference voltage as an internal voltage, and an internal voltage control unit suitable for selectively providing a voltage having a target level corresponding to the internal voltage as the internal voltage in response to the external voltage detection signal.

In accordance with an exemplary embodiment of the present invention, a semiconductor device may include an external voltage detection unit suitable for detecting a voltage level of an external voltage to output an external voltage detection signal based on the detected result, a reference voltage generation unit suitable for generating a reference voltage based on the external voltage, an internal voltage generation unit suitable for selectively generating a voltage corresponding to the reference voltage as an internal voltage in response to the external voltage detection signal, and a driving unit suitable for selectively driving an internal voltage terminal to the external voltage in response to the external voltage detection signal.

In accordance with an exemplary embodiment of the present invention, a semiconductor device may include an external voltage detection unit suitable for detecting an external voltage in an over-voltage state to output an external voltage detection signal based on the detected result, a reference voltage generation unit suitable for generating a reference voltage based on the external voltage, an internal voltage detecting unit suitable for comparing an internal voltage with the reference voltage to generate a pumping enable signal an oscillating unit suitable for outputting an oscillation signal in response to the pumping enable signal, an oscillation signal blocking unit suitable for selectively blocking a transfer of the oscillation signal in response to the external voltage detection signal to output an internal oscillation signal, a pumping unit suitable for selectively generating the internal voltage in response to the internal oscillation signal outputted from the oscillation signal blocking unit, and a driving unit suitable for selectively driving an internal voltage terminal to the external voltage in response to the external voltage detection signal.

DETAILED DESCRIPTION

Figure 1:
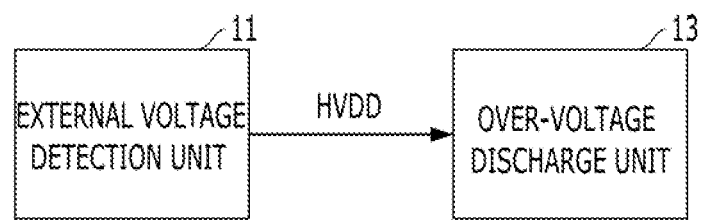
FIG. 1 is a block diagram illustrating a conventional protection circuits
Figure 2:
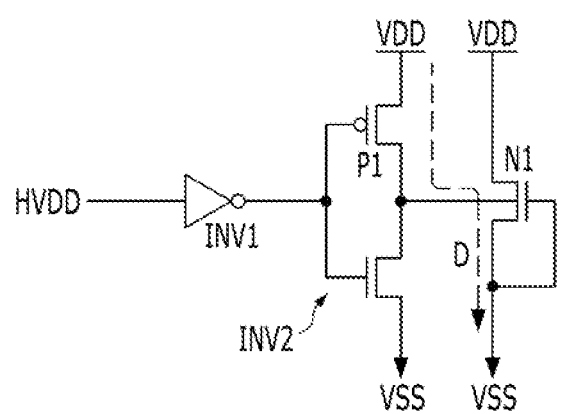
FIG. 2 is a detailed circuit diagram illustrating an over-voltage discharge unit shown in FIG. 1.
Figure 3:
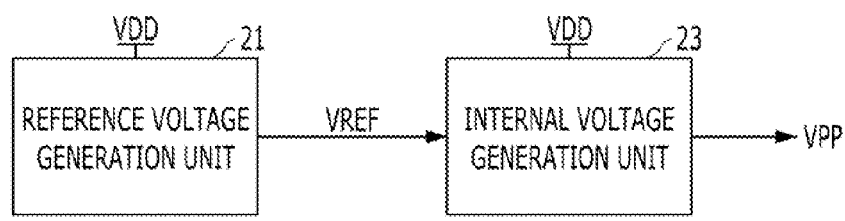
FIG. 3 is a block diagram illustrating a conventional internal voltage generation unit.
Figure 4:
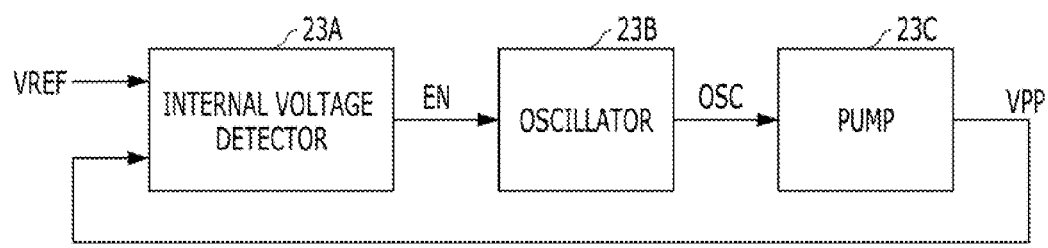
FIG. 4 is a detailed circuit diagram illustrating the conventional internal voltage generation unit shown in FIG. 3.

Various exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like numbered parts in the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically mentioned in a sentence.

Figure 6:
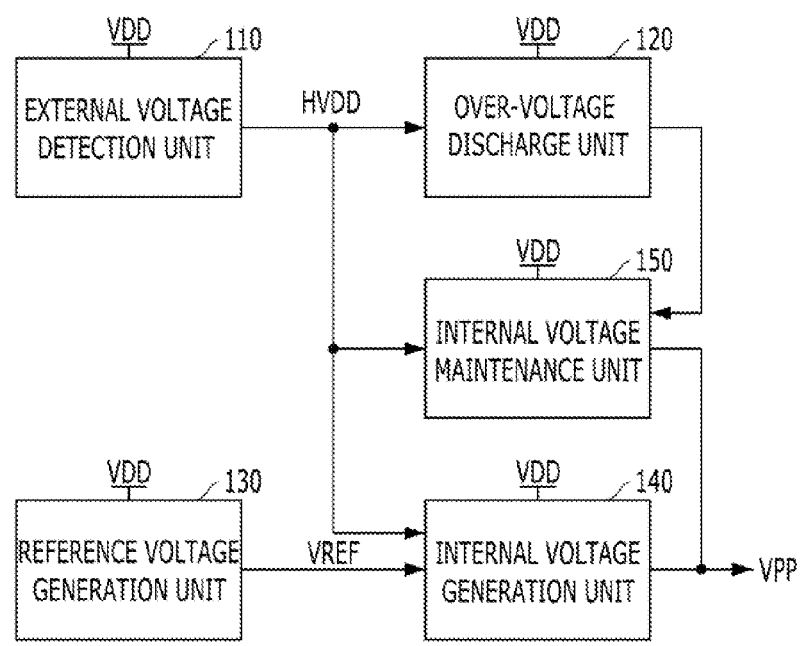
FIG. 6 is a block diagram illustrating a semiconductor device in accordance with an exemplary embodiment of the present invention.

FIG. 6 is a block diagram illustrating a semiconductor device in accordance with an exemplary embodiment of the present invention.

Referring to FIG. 6, the semiconductor device 100 includes an external voltage detection unit 110, an over-voltage discharge unit 120, a reference voltage generation unit 130, an internal voltage generation unit 140, and an internal voltage maintenance unit 150. The external voltage detection unit 110 detects a voltage level of a supply voltage VDD supplied from external to output an external voltage detection signal HVDD based on the detected result. The over-voltage discharge unit 120 discharges the supply voltage VDD in an over-voltage state in response to the external voltage detection signal HVDD. The reference voltage generation unit 130 generates a reference voltage VREF based on the supply voltage VDD. The internal voltage generation unit 140 generates a boost voltage VPP corresponding to the reference voltage VREF while being enabled in response to the external voltage detection signal HVDD. The internal voltage maintenance unit 150 maintains a boost voltage (VPP) terminal to a target level corresponding to the boost voltage VPP while being enabled contrary to the internal voltage generation unit 140 in response to the external voltage detection signal HVDD.

Here, the external voltage detection unit 110 detects the voltage level of the supply voltage VDD and activates the external voltage detection signal HVDD when the supply voltage VDD is out of range to be in an over-voltage state. The supply voltage VDD may become in the over-voltage state due to an electrical over-stress (EOS). For reference, the EOS is an electrical shock such as abnormal over-current or over-voltage due to leakage current and voltage of devices using a power supply voltage, and may occur for nanoseconds to milliseconds.

The over-voltage discharge unit 120 serves as a protection circuit for protecting internal circuits from the EOS, and serves to return the supply voltage VDD to a normal-voltage state from the over-voltage state by a discharging operation when the external voltage detection signal HVDD is activated.

The reference voltage generation unit 130 generates a reference voltage VREF corresponding to a target level of the boost voltage VPP. At this time, due to the supply voltage VDD in the over-voltage state, the reference voltage generation unit 130 may generate the reference voltage VREF having an abnormal state by using the supply voltage VDD as a source voltage.

The internal voltage generation unit 140 includes an internal voltage generating circuit having a pump type to generate the boost voltage VPP by pumping the supply voltage VDD. In response to the external voltage detection signal HVDD, the internal voltage generation unit 140 is enabled when the supply voltage VDD is in the normal-voltage state, and disabled when the supply voltage VDD is in the over-voltage state.

When the internal voltage generation unit 140 is disabled in response to the external voltage detection signal HVDD, the internal voltage maintenance unit 150 is enabled to maintain the boost voltage (VPP) terminal to a target level corresponding to the boost voltage VPP. On the contrary, when the internal voltage generation unit 140 is enabled in response to the external voltage detection signal HVDD, the internal voltage maintenance unit 150 is disabled.

Figure 5:
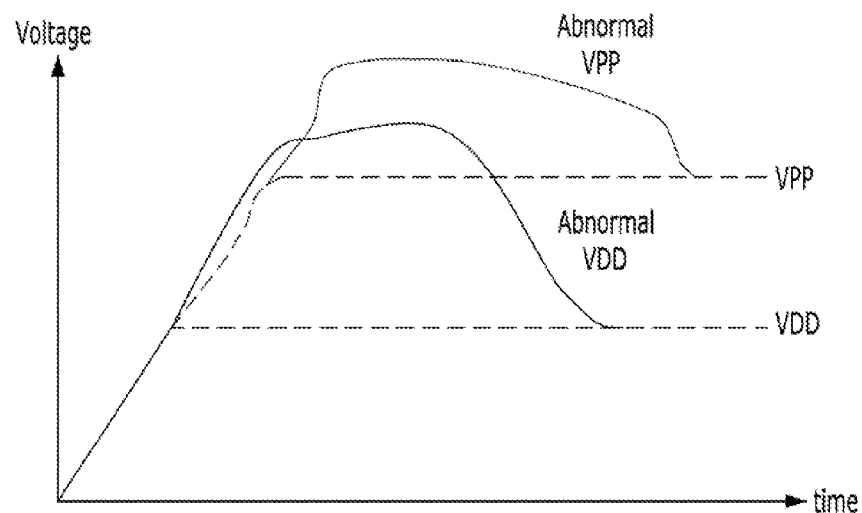
FIG. 5 is a graph illustrating an abnormal operation of a conventional semiconductor device.
Figure 7:
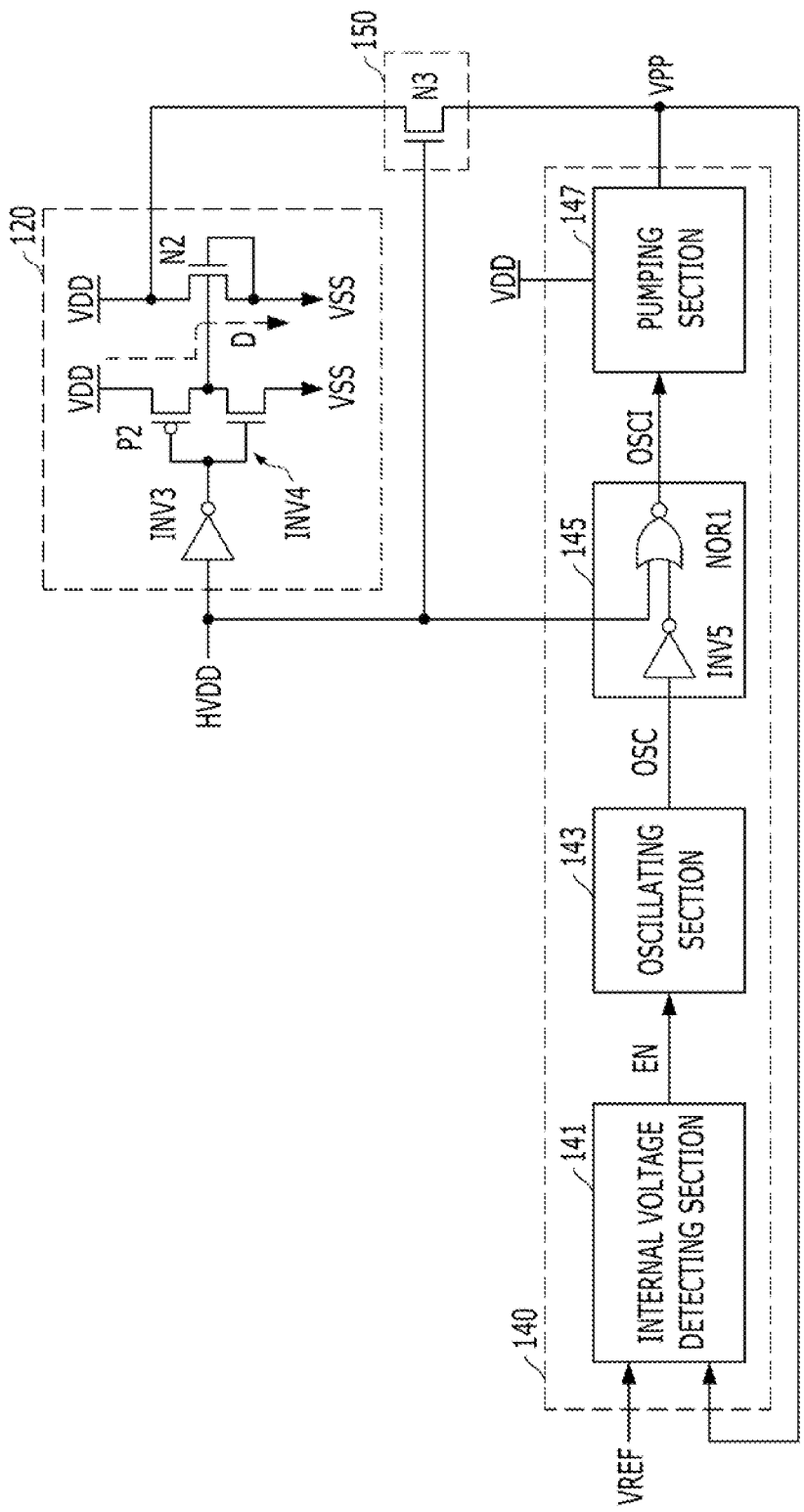
FIG. 7 is a detailed circuit diagram of an over-voltage discharge unit, an internal voltage generation unit, and an internal voltage maintenance unit shown in FIG. 6.

FIG. 7 is a detailed circuit diagram of the over-voltage discharge unit 120, the internal voltage generation unit 140, and the internal voltage maintenance unit 150 shown in FIG. 5.

Referring to FIG. 7, the over-voltage discharge unit 120 includes a first inverter INV3, a second inverter INV4, and a first NMOS transistor N2. The first inverter INV3 inverts the external voltage detection signal HVDD. The second inverter INV4 inverts and outputs an output signal of the first inverter INV3. The first NMOS transistor N2 has a drain-source path between a supply voltage (VDD) terminal and a ground voltage (VSS) terminal, and a gate coupled to the ground voltage (VSS) terminal, and receives an output signal of the second inverter INV4 as a bulk bias. Accordingly, when the supply voltage VDD becomes in the over-voltage state due to the EOS, the over-voltage discharge unit 120 may perform a discharge operation by forming a discharge path D from a PMS transistor P2 included in the second inverter INV4 to a source terminal of the first NMOS transistor N2, in response to the external voltage detection signal HVDD.

The internal voltage generation unit 140 includes an internal voltage detecting section 141, an oscillating section 143, an oscillation signal blocking section 145, and a pumping section 147. The internal voltage detecting section 141 compares the boost voltage VPP with the reference voltage VREF to generate a pumping enable signal EN. The oscillating section 143 outputs an oscillation signal OSC in response to the pumping enable signal EN. The oscillation signal blocking section 145 selectively blocks a transfer of the oscillation signal OSC in response to the external voltage detection signal HVDD. The pumping section 147 generates the boost voltage VPP in response to an internal oscillation signal OSCI outputted from the oscillation signal blocking section 145.

Here, the internal voltage detecting section 141 activates the pumping enable signal EN when the boost voltage VPP is lower than the reference voltage VREF, and deactivates the pumping enable signal EN when the boost voltage VPP is higher than or identical to the reference voltage VREF. The oscillating section 143 outputs the oscillation signal OSC while the pumping enable signal EN is activated.

The oscillation signal blocking section 145 blocks the transfer of the oscillation signal OSC when the external voltage detection signal HVDD is activated, and transfers the oscillation signal OSC to the pumping section 147 when the external voltage detection signal HVDD is deactivated. In this embodiment, the oscillation signal blocking section 145 includes a third inverter INV5 and a NOR gate NOR1. The third inverter INV5 inverts the oscillation signal OSC. The NOR gate NOR1 performs a NOR operation on the external voltage detection signal HVDD and an output of the third inverter INV5 to output the internal oscillation signal OSCI.

The pumping section 147 generates the boost voltage VPP by boosting the supply voltage VDD in response to the internal oscillation signal OSCI. The pumping section 147 does not perform a boosting operation in response to the internal oscillation signal OSCI which is blocked by the oscillation signal blocking section 145, when the supply voltage VDD is in the over-voltage state.

Meanwhile, the internal voltage maintenance unit 150 includes a driving unit suitable for driving the boost voltage (VPP) terminal with the supply voltage VDD in response to the external voltage detection signal HVDD. For example, the driving unit may include a second NMOS transistor N3 which has a drain-source path between the supply voltage (VDD) terminal and the boost voltage (VPP) terminal, and a gate receiving the external voltage detection signal HVDD. Accordingly, when the internal voltage maintenance unit 150 is enabled, the boost voltage (VPP) terminal is maintained at a voltage level (VDD-Vth) that is obtained by subtracting a threshold voltage Vth of the second NMOS transistor 13 from the supply voltage VDD.

Figure 8:
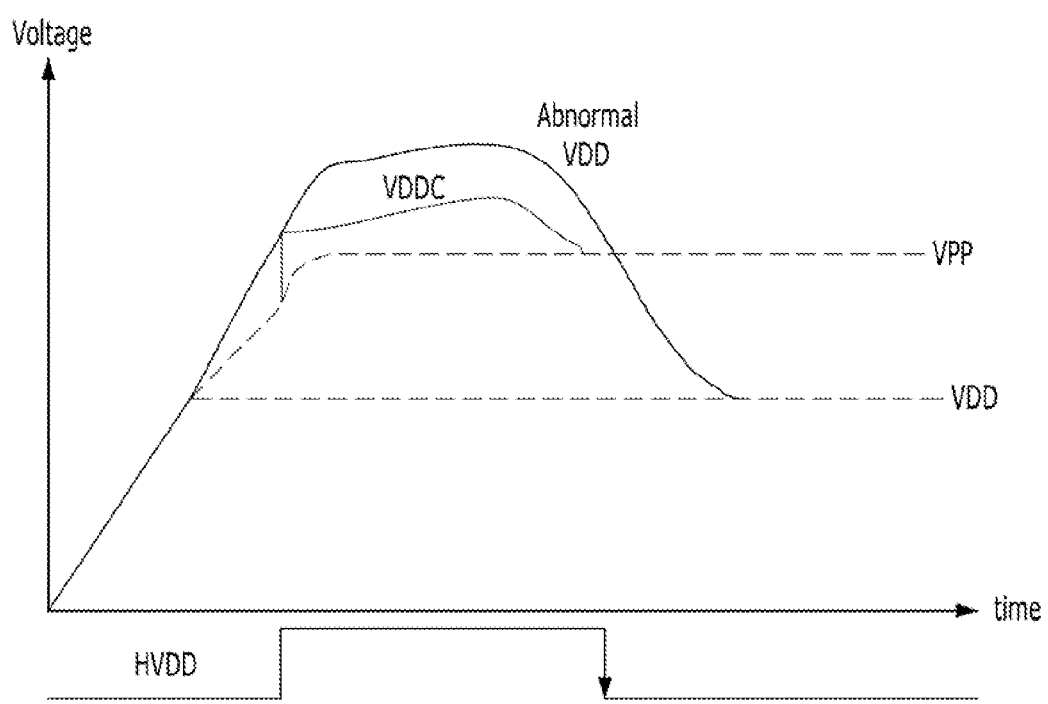
FIG. 8 is a graph illustrating an operation of a semiconductor device in accordance with an exemplary embodiment of the present invention.

FIG. 8 is a graph illustrating an operation of a semiconductor device in accordance with an exemplary embodiment of the present invention.

Hereinafter, referring to FIGS. 6 to 8, an operation of the semiconductor device 100 in accordance with the exemplary embodiment is described in detail.

Prior to explaining FIG. 8, when the supply voltage VDD is in the normal-voltage state, the operation of the semiconductor device 100 is as follows. First, the external voltage detection unit 110 detects the voltage level of the supply voltage VDD in the normal-voltage state and deactivates the external voltage detection signal HVDD. Thus, the over-voltage discharge unit 120 and the internal voltage maintenance unit 150 are disabled, and the internal voltage generation unit 140 is enabled to generate and maintain the boost voltage VPP corresponding to the reference voltage VREF by pumping the supply voltage VDD.

In FIG. 8, the operation of the semiconductor device 100 is described when the supply voltage VDD is in the over-voltage state.

As shown in FIG. 8, when an EOS occurs, the supply voltage VDD is to be an abnormal state. That is, the supply voltage VDD is out of range to be in the over-voltage state (refer to a solid line).

At this time, the external voltage detection unit 110 detects a voltage level of the supply voltage VDD in the over-voltage state to activate the external voltage detection signal HVDD based on the detected result. For example, the external voltage detection signal HVDD transits to a logic high level from a logic low level.

Subsequently, the internal voltage generation unit 140 is disabled, and the over-voltage discharge unit 120 and the internal voltage maintenance unit 150 are enabled.

In detail, the over-voltage discharge unit 120 forms a discharge path between the supply voltage (VDD) terminal and the ground voltage (VS) terminal to discharge the supply voltage VDD from the over-voltage state to the normal-voltage state. Thus, the supply voltage VDD returns to the normal-voltage state from the over-voltage state.

At the same time, the internal voltage maintenance unit 150 clamps the supply voltage VDD in the over-voltage state to supply a clamping supply voltage VDDC to the boost voltage (VPP) terminal. That is, the internal voltage maintenance unit 150 drives the boost voltage (VPP) terminal to the supply voltage VDD in the over-voltage state, and the boost voltage (VPP) terminal is maintained at a voltage level (VDD-Vth), i.e., the clamping supply voltage VDDC, which is obtained by subtracting a threshold voltage Vth of the second NMOS transistor N3 from the supply voltage VDD.

Thereafter, if the supply voltage VDD returns to the normal-voltage state (refer to a dotted line) from the over-voltage state (refer to a solid line), the external voltage detection unit 110 detects the voltage level of the supply voltage VDD in the normal-voltage state to deactivate the external voltage detection signal HVDD based on the detected result. For example, the external voltage detection signal HVDD transits to a logic low level from a logic high level. Accordingly, the internal voltage generation unit 140 is enabled, and the over-voltage discharge unit 120 and the internal voltage maintenance unit 150 are disabled.

Meanwhile, when the supply voltage VDD is in the over-voltage state, the oscillation signal blocking section 145 of the internal voltage generation unit 140 blocks the transfer of the oscillation signal OSC outputted from the oscillating section 143 to the pumping section 147 in response to an activation of the external voltage detection signal HVDD. Accordingly, even if the reference voltage VREF is increased due to the supply voltage VDD in the over-voltage state and the oscillation signal OSC is continuously outputted from the oscillating section 143 according to the increased reference voltage VREF, an abnormal pumping operation of the pumping section 147 may be prevented since the oscillation signal blocking section 145 blocks the transfer of the oscillation signal OSC.

As a result, in case where the supply voltage VDD is in the over-voltage state due to the EOS, i.e., in an abnormal state, the over-voltage discharge unit 120 performs a discharge operation, and at the same time, the internal voltage generation unit 140 stops a pumping operation, thereby maintaining the boost voltage (VPP) terminal at the voltage level (VDD-Vth), i.e., the clamping supply voltage VDDC.

As described above, the semiconductor device in accordance with the exemplary embodiment may block an abnormal pumping operation induced by an electrical over-stress (EOS) to reduce/minimize current consumption and degradation of power lines according to the abnormal pumping operation.

In other words, when the EOS occurs, the semiconductor device may be primarily protected from the EOS by a discharge operation, and may be secondarily protected from an abnormal operation of an internal voltage generation circuit, which is induced by the EOS.

While the present invention has been described with respect to the specific embodiments, it will be apparent to those skilled in the art that various changes and modifications may be made without departing from the spirit and scope of the invention as defined in the following claims.

For example, although the description has been made of the semiconductor device generating a boosting voltage VPP, the present invention is not limited to this structure. In another embodiment, a semiconductor device which generates a back-bias voltage VBB by a pumping operation may be applied.

What is claimed is:

1. A semiconductor device comprising:
   an external voltage detection unit suitable for detecting a voltage level of an external voltage to output an external voltage detection signal based on the detected result;
   a reference voltage generation unit suitable for generating a reference voltage based on the external voltage;
   an internal voltage generation unit enabled in response to the external voltage detection signal, suitable for selectively generating a voltage corresponding to the reference voltage as an internal voltage; and
   an internal voltage control unit disabled when the internal voltage generation unit is enabled, suitable for selectively providing a voltage having a target level corresponding to the internal voltage as the internal voltage in response to the external voltage detection signal.

2. The semiconductor device of claim 1, wherein the target level corresponding to the internal voltage includes a voltage that the external voltage in an over-voltage state is clamped.

3. The semiconductor device of claim 1, wherein the internal voltage generation unit includes a circuit of pump type.

4. The semiconductor device of claim 1, further comprising:
   an over-voltage discharge unit suitable for discharging the external voltage in an over-voltage state in response to the external voltage detection signal.

5. The semiconductor device of claim 1, wherein the internal voltage generation unit is suitable for being enabled when the external voltage detection signal has a value indicating that the external voltage has a normal voltage, and generating the voltage corresponding to the reference voltage as the internal voltage.

6. The semiconductor device of claim 1, wherein the internal voltage control unit is suitable for being enabled when the external voltage detection signal has a value indicating that the external voltage is in the over voltage state, and providing the voltage having the target level corresponding to the internal voltage as the internal voltage.

7. A semiconductor device comprising:
   an external voltage detection unit suitable for detecting a voltage level of an external voltage to output an external voltage detection signal based on the detected result;
   a reference voltage generation unit suitable for generating a reference voltage based on the external voltage;
   an internal voltage generation unit suitable for selectively generating a voltage corresponding to the reference voltage as an internal voltage in response to the external voltage detection signal; and a driving unit suitable for selectively driving an internal voltage terminal to the external voltage in response to the external voltage detection signal, wherein the driving unit is disable when the internal voltage generation unit is enabled in response to the external voltage detection signal.

8. The semiconductor device of claim 7, wherein the internal voltage generation unit includes a circuit of pump type.

9. The semiconductor device of claim 7, further comprising:

an over-voltage discharge unit suitable for discharging the external voltage in an over-voltage state based on the detected result of the external voltage detection unit.

10. The semiconductor device of claim 7, wherein the internal voltage generation unit is suitable for being enabled when the external voltage detection signal has a value indicating that the external voltage has a normal voltage, and generating the voltage corresponding to the reference voltage as the internal voltage.

11. The semiconductor device of claim 7, wherein the driving unit is suitable for being enabled when the external voltage detection signal has a value indicating that the external voltage is in the over voltage state, and driving the internal voltage terminal to the external voltage.

12. A semiconductor device comprising:

an external voltage detection unit suitable for detecting an external voltage in an over-voltage state to output an external voltage detection signal based on the detected result;

a reference voltage generation unit suitable for generating a reference voltage based on the external voltage;

an internal voltage detecting unit suitable for comparing an internal voltage with the reference voltage to generate a pumping enable signal;

an oscillating unit suitable for outputting an oscillation signal in response to the pumping enable signal;

an oscillation signal blocking unit suitable for selectively blocking a transfer of the oscillation signal in response to the external voltage detection signal to output an internal oscillation signal;

a pumping unit suitable for selectively generating the internal voltage in response to the internal oscillation signal outputted from the oscillation signal blocking unit; and a driving unit suitable for selectively driving an internal voltage terminal to the external voltage in response to the external voltage detection signal.

13. The semiconductor device of claim 12, wherein the driving unit is enabled when the external voltage is in the over-voltage state, and the internal voltage terminal is maintained at a voltage level obtained by subtracting a threshold voltage of the driving unit from the external voltage.

14. The semiconductor device of claim 12, further comprising:

an over-voltage discharge unit suitable for discharging the external voltage in the over-voltage state in response to the external voltage detection signal.

15. The semiconductor device of claim 12, wherein the pumping unit is suitable for generating the voltage corresponding to the reference voltage as the internal voltage when the internal oscillation signal has a value indicating that the external voltage has a normal voltage.

16. The semiconductor device of claim 12, wherein the driving unit is suitable for being enabled when the external voltage detection signal has a value indicating that the external voltage is in the over voltage state, and driving the internal voltage terminal to the external voltage.

* * * * *